United States Patent
Gula et al.

(10) Patent No.: US 10,447,654 B2
(45) Date of Patent: *Oct. 15, 2019

(54) SYSTEM AND METHOD FOR FACILITATING DATA LEAKAGE AND/OR PROPAGATION TRACKING

(71) Applicant: Tenable, Inc., Columbia, MD (US)

(72) Inventors: Ron Gula, Marriottsville, MD (US); Marcus Ranum, Morrisdale, PA (US)

(73) Assignee: Tenable, Inc., Columbia, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/718,370

(22) Filed: Sep. 28, 2017

(65) Prior Publication Data

US 2018/0019971 A1 Jan. 18, 2018

Related U.S. Application Data (63) Continuation of application No. 15/179,933, filed on Jun. 10, 2016, now Pat. No. 9,794,223, which is a (Continued)

(51) Int. Cl.
*H04L 29/06* (2006.01)
*G06F 21/64* (2013.01)
(Continued)

(52) U.S. Cl.
CPC .......... *H04L 63/0236* (2013.01); *G06F 21/64* (2013.01); *H04L 63/0876* (2013.01); (Continued)

(58) Field of Classification Search
CPC ............. H04L 63/0236; H04L 63/0876; H04L 63/1408; H04L 21/64; H04L 12/0864; H04L 17/30097; H04L 17/30109
See application file for complete search history.

(56) References Cited

U.S. PATENT DOCUMENTS

| 4,525,599 A | 6/1985 | Curran et al. ............. 178/22.08 |
| 5,541,997 A | 7/1996 | Pappas et al. .................. 380/49 |

(Continued)

OTHER PUBLICATIONS

Wack, John, et al., "NIST Special Publication 800-42, Guideline on Network Security Testing", Computer Security Division, National Institute of Standards and Technology, Oct. 2003, pp. 1-92.

(Continued)

*Primary Examiner* — Azizul Choudhury
(74) *Attorney, Agent, or Firm* — Pillsbury Winthrop Shaw Pittman, LLP (57) ABSTRACT

In some embodiments, a set of hashes that are associated with files of a user system, and a reference set of hashes that are associated with files of a reference system, may be obtained. An additional subset of hashes (included in the set of hashes and not included in the reference set of hashes) may be obtained based on a comparison between the set of hashes and the reference set of hashes. A file may be predicted to be exclusive for certain users or user systems, where the file is associated with a hash included in the additional subset of hashes. Other user systems may be scanned to determine what files are on the other user systems, where each of the other user systems is assigned to another user or is not one of the user systems. An alert indicating unauthorized activity may be generated based on the scan.

20 Claims, 3 Drawing Sheets

Related U.S. Application Data continuation of application No. 13/403,108, filed on Feb. 23, 2012, now Pat. No. 9,367,707.

(51) Int. Cl.
*G06F 12/0864* (2016.01)
*G06F 16/13* (2019.01)
*G06F 16/14* (2019.01)

(52) U.S. Cl.
CPC ...... *H04L 63/1408* (2013.01); *G06F 12/0864* (2013.01); *G06F 16/137* (2019.01); *G06F 16/152* (2019.01)

(56) References Cited

U.S. PATENT DOCUMENTS

| | | | |
|---|---|---|---|
| 5,572,729 A | 11/1996 | Giordano et al. | 395/616 |
| 5,715,391 A | 2/1998 | Jackson et al. | 395/200.01 |
| 5,721,819 A | 2/1998 | Galles et al. | 395/200.15 |
| 5,838,919 A | 11/1998 | Schwaller et al. | 395/200.54 |
| 5,844,817 A | 12/1998 | Lobley et al. | 364/578 |
| 6,154,775 A | 11/2000 | Coss et al. | 709/225 |
| 6,266,774 B1 | 7/2001 | Sampath et al. | 713/201 |
| 6,269,447 B1 | 7/2001 | Maloney et al. | 713/201 |
| 6,324,656 B1 | 11/2001 | Gleichauf et al. | 714/37 |
| 6,393,568 B1 | 5/2002 | Ranger et al. | 713/188 |
| 6,415,280 B1 | 7/2002 | Farber et al. | 707/698 |
| 6,415,321 B1 | 7/2002 | Gleichauf et al. | 709/224 |
| 6,487,666 B1 | 11/2002 | Shanklin et al. | 713/201 |
| 6,499,107 B1 | 12/2002 | Gleichauf et al. | 713/201 |
| 6,510,509 B1 | 1/2003 | Chopra et al. | 712/13 |
| 6,606,663 B1 | 8/2003 | Liao et al. | 709/229 |
| 6,704,874 B1 | 3/2004 | Porras et al. | 713/201 |
| 6,711,127 B1 | 3/2004 | Gorman et al. | 370/230 |
| 6,789,202 B1 | 9/2004 | Ko et al. | 713/201 |
| 6,847,982 B2 | 1/2005 | Parker et al. | 707/200 |
| 6,873,617 B1 | 3/2005 | Karras | 370/389 |
| 6,882,728 B1 | 4/2005 | Takahashi et al. | 380/201 |
| 6,886,020 B1 | 4/2005 | Zahavi et al. | 707/204 |
| 6,952,779 B1 | 10/2005 | Cohen et al. | 713/200 |
| 6,957,348 B1 | 10/2005 | Flowers et al. | 713/201 |
| 6,968,377 B1 | 11/2005 | Gleichauf et al. | 709/224 |
| 7,017,186 B2 | 3/2006 | Day | 726/23 |
| 7,073,198 B1 | 7/2006 | Flowers et al. | 726/25 |
| 7,093,287 B1 | 8/2006 | Gusler et al. | 726/13 |
| 7,107,619 B2 | 9/2006 | Silverman | 726/27 |
| 7,120,148 B1 | 10/2006 | Batz et al. | 370/392 |
| 7,134,141 B2 | 11/2006 | Crosbie et al. | 726/23 |
| 7,139,819 B1 | 11/2006 | Luo et al. | 709/223 |
| 7,152,105 B2 | 12/2006 | McClure et al. | 709/224 |
| 7,162,742 B1 | 1/2007 | Flowers et al. | 726/25 |
| 7,181,769 B1 | 2/2007 | Keanini et al. | 726/23 |
| 7,237,264 B1 | 6/2007 | Graham et al. | 726/23 |
| 7,240,210 B2 | 7/2007 | Mihcak et al. | 713/180 |
| 7,243,366 B2 | 7/2007 | Medvinsky et al. | 726/2 |
| 7,272,646 B2 | 9/2007 | Cooper et al. | 709/223 |
| 7,290,145 B2 | 10/2007 | Falkenthros | 713/182 |
| 7,310,687 B2 | 12/2007 | Psounis et al. | 709/247 |
| 7,324,551 B1 | 1/2008 | Stammers | 370/468 |
| 7,475,426 B2 | 1/2009 | Copeland, III | 726/23 |
| 7,509,681 B2 | 3/2009 | Flowers et al. | 726/25 |
| 7,587,761 B2 | 9/2009 | Duffield et al. | 726/22 |
| 7,594,273 B2 | 9/2009 | Keanini et al. | 726/25 |
| 7,653,647 B2 | 1/2010 | Borthakur et al. | 707/102 |
| 7,661,134 B2 | 2/2010 | Radatti | 726/22 |
| 7,735,100 B1 | 6/2010 | Sallam | 719/330 |
| 7,739,377 B2 | 6/2010 | Benedetti et al. | 709/224 |
| 7,761,918 B2 | 7/2010 | Gula et al. | 726/23 |
| 7,904,479 B2 | 3/2011 | Zuk | 707/791 |
| 7,908,254 B2 | 3/2011 | Suermondt et al. | 707/698 |
| 7,926,113 B1 | 4/2011 | Gula et al. | 726/25 |
| 7,936,682 B2 | 5/2011 | Singh et al. | 370/241 |
| 7,966,358 B2 | 6/2011 | Deolalikar et al. | 708/250 |
| 8,069,484 B2 | 11/2011 | McMillan et al. | 726/23 |
| 8,135,815 B2 | 3/2012 | Mayer | 709/223 |
| 8,291,498 B1 | 10/2012 | Liang et al. | 726/24 |
| 8,302,198 B2 | 10/2012 | Deraison | 726/25 |
| 8,438,270 B2 | 5/2013 | Nappier et al. | 709/224 |
| 8,484,372 B1 | 7/2013 | Callon | 709/238 |
| 8,549,650 B2 | 10/2013 | Hanson | 726/25 |
| 8,707,440 B2 | 4/2014 | Gula et al. | 726/25 |
| 8,839,442 B2 | 9/2014 | Deraison | 726/25 |
| 9,367,707 B2* | 6/2016 | Gula | G06F 21/64 |
| 9,794,223 B2* | 10/2017 | Gula | G06F 21/64 |
| 2001/0034847 A1 | 10/2001 | Gaul, Jr. | 713/201 |
| 2002/0019945 A1 | 2/2002 | Houston et al. | 713/201 |
| 2002/0093527 A1 | 7/2002 | Sherlock et al. | 345/736 |
| 2002/0100023 A1 | 7/2002 | Ueki et al. | 717/127 |
| 2002/0107841 A1 | 8/2002 | Hellerstein et al. | 707/3 |
| 2002/0166063 A1 | 11/2002 | Lachman, III et al. | 713/200 |
| 2003/0051026 A1 | 3/2003 | Carter et al. | 709/224 |
| 2003/0056116 A1 | 3/2003 | Bunker, V et al. | 713/201 |
| 2003/0135517 A1 | 7/2003 | Kauffman | 707/103 R |
| 2003/0145225 A1 | 7/2003 | Bruton, III et al. | 713/201 |
| 2003/0196123 A1 | 10/2003 | Rowland et al. | 713/201 |
| 2004/0003266 A1 | 1/2004 | Moshir et al. | 713/191 |
| 2004/0015719 A1 | 1/2004 | Lee et al. | 713/201 |
| 2004/0030796 A1 | 2/2004 | Cooper et al. | 709/231 |
| 2004/0034795 A1 | 2/2004 | Anderson et al. | 713/201 |
| 2004/0042470 A1 | 3/2004 | Cooper et al. | 370/401 |
| 2004/0193918 A1 | 9/2004 | Green et al. | 713/201 |
| 2005/0068928 A1 | 3/2005 | Smith et al. | 370/338 |
| 2005/0108578 A1 | 5/2005 | Tajalli et al. | 713/201 |
| 2005/0128988 A1 | 6/2005 | Simpson et al. | 370/338 |
| 2005/0131900 A1 | 6/2005 | Palliyll et al. | 707/10 |
| 2005/0188419 A1 | 8/2005 | Dadhia et al. | 726/1 |
| 2005/0203886 A1 | 9/2005 | Wong | 707/3 |
| 2005/0203921 A1 | 9/2005 | Newman et al. | 707/100 |
| 2005/0229255 A1 | 10/2005 | Gula et al. | 726/23 |
| 2006/0010245 A1 | 1/2006 | Carnahan | 709/231 |
| 2006/0018466 A1 | 1/2006 | Adelstein et al. | 380/46 |
| 2006/0117091 A1 | 6/2006 | Justin | 709/217 |
| 2006/0184682 A1 | 8/2006 | Suchowski et al. | 709/229 |
| 2006/0191008 A1 | 8/2006 | Fernando et al. | 726/23 |
| 2006/0282894 A1 | 12/2006 | Duffield et al. | 726/23 |
| 2006/0294152 A1 | 12/2006 | Kawabe et al. | 707/200 |
| 2007/0028304 A1 | 2/2007 | Brennan | 726/24 |
| 2007/0169190 A1 | 7/2007 | Kolton et al. | 726/22 |
| 2007/0256129 A1 | 11/2007 | Jung et al. | 726/24 |
| 2007/0271598 A1 | 11/2007 | Chen et al. | 726/4 |
| 2007/0271613 A1 | 11/2007 | Joyce | 726/23 |
| 2007/0277238 A1 | 11/2007 | Margalit et al. | 726/22 |
| 2008/0022400 A1 | 1/2008 | Cohen et al. | 726/22 |
| 2008/0047009 A1 | 2/2008 | Overcash et al. | 726/23 |
| 2008/0072285 A1 | 3/2008 | Sankaran et al. | 726/2 |
| 2008/0307524 A1 | 12/2008 | Singh et al. | 726/22 |
| 2009/0013141 A1 | 1/2009 | Kinoshita | 711/163 |
| 2009/0049016 A1 | 2/2009 | Sakamoto | 707/3 |
| 2009/0138945 A1 | 5/2009 | Savchuk | 726/4 |
| 2009/0177782 A1 | 7/2009 | Blatherwick et al. | 709/228 |
| 2010/0030780 A1 | 2/2010 | Eshghi et al. | 707/6 |
| 2010/0043066 A1 | 2/2010 | Miliefsky | 726/9 |
| 2010/0100587 A1 | 4/2010 | Teglovic et al. | 709/203 |
| 2010/0114842 A1 | 5/2010 | Forman et al. | 707/692 |
| 2010/0281539 A1 | 11/2010 | Burns et al. | 726/23 |
| 2011/0099631 A1 | 4/2011 | Willebeek-LeMair et al. 726/23 |
| 2011/0113029 A1 | 5/2011 | Kaal | 707/723 |
| 2011/0185055 A1 | 7/2011 | Nappier et al. | 709/224 |
| 2011/0185431 A1 | 7/2011 | Deraison | 726/25 |
| 2011/0231935 A1 | 9/2011 | Gula et al. | 726/25 |
| 2011/0277034 A1 | 11/2011 | Hanson | 726/25 |
| 2011/0314245 A1 | 12/2011 | Hanes et al. | 711/164 |
| 2013/0247148 A1 | 9/2013 | Nappier et al. | 726/3 |
| 2014/0013436 A1 | 1/2014 | Deraison | 726/25 |

OTHER PUBLICATIONS

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events (56) References Cited

OTHER PUBLICATIONS and Configurations", Revision 2, Tenable Network Security, Jan. 27, 2009, 12 pages.

Zhang, Yin, et al., "Detecting Backdoors", *Proceedings of the 9th USENIX Security Symposium*, Denver, Colorado, Aug. 2000, 11 pages.

"Basic Cryptanalysis", Department of the Army, Field Manual No. 34-40-2, Sep. 13, 1990, 363 pages.

Kim, Gene H., et al., "The Design and Implementation of Tripwire: A File System Integrity Checker", *Proceedings of the 2nd ACM Conference on Computer and Communications Security*, 1994, (Purdue Technical Report CSD-TR-93-071), 18 pages.

Oline, Adam, et al., "Exploring Three-Dimensional Visualization for Intrusion Detection", Workshop on Visualization for Computer Security, IEEE, Oct. 26, 2005, 9 pages.

"Present Your Data in a Column Chart", Microsoft, 2007, 6 pages.

Kim et al., "Real-Time Visualization of Network Attacks on High-Speed Links", IEEE, 2004, 10 pages.

Huang et al., "Research of Security Metric Architecture for Next Generation Network", IEEE, 2009, 6 pages.

\* cited by examiner

SYSTEM AND METHOD FOR FACILITATING DATA LEAKAGE AND/OR PROPAGATION TRACKING

CROSS-REFERENCE TO RELATED APPLICATIONS

This application is a continuation of U.S. patent application Ser. No. 15/179,933, filed Jun. 10, 2016, which is a continuation of U.S. patent application Ser. No. 13/403,108, filed Feb. 23, 2012, each of which is incorporated herein in its entirety by reference.

FIELD OF THE INVENTION

The invention generally relates to a system and method for facilitating data leakage and/or propagation tracking.

BACKGROUND OF THE INVENTION

An important trend in securing an information technology infrastructure relates to preventing theft, disclosure, leakage, or other unauthorized propagation associated with sensitive data and information. For example, underground markets have already shown an ability to monetize data and documents improperly leaked or propagated in a manner that violates organizational policy or contravenes organizational boundaries, which has led to governments pursuing efforts to impose fines and other penalties on organizations that leak sensitive data. Consequently, an organization that inadvertently allows unauthorized access to sensitive data may be penalized on multiple fronts because fines may be imposed to penalize the data leakage, and moreover, the organization must further deal with risks that the leaked data may be improperly used to attack or otherwise compromise the organization. The problems associated with data leakage and document propagation can be expected to increase substantially in the near future because many (or most) lawmakers, regulators, security managers, and other "powers that be" have yet to realize the pace and extent to which sensitive data has become exposed and distributed.

For example, many emerging information technology services use cloud-based technologies to enable users to share files with others and transfer work between different computing environments, which can provide users with various benefits (e.g., overcoming restrictions on the size associated with files that be attached to individual emails, addressing problems that arise when an inbox grows too large because many emails have large file attachments, expanding access to files beyond internal file sharing services that otherwise limit access to users that are connected locally or via virtual private networks, and making files available in different computing environments despite the fact that many information technology departments do not offer easy ways to share files via public FTP servers and other traditional methods due to security concerns). Despite the potential benefits that cloud-based services may offer, security and usage associated therewith often violates corporate policies and security best practices. As such, organizations must assess how cloud-based technologies align with their security policies and compliance mandates and monitor usage associated with these technologies to ensure compliance and limit data exposure without undermining the benefits that these technologies offer. However, existing network security systems tend to have limitations in their ability to detect whether software to interact with cloud-based services has been installed on client computers (e.g., because the client software may not be actively uploading or downloading data when the client computers are scanned). Furthermore, existing network security systems typically cannot properly implement monitoring, encryption, and other security measures at a level that can appropriately detect and protect sensitive data from being insecurely transmitted to a cloud-based service. For example, many cloud-based services communicate data over trusted SSL sessions, but recent trends in the network security community have discovered several recent attacks that have circumvented SSL security and compromised SSL certificate authorities, whereby data transmitted to or from cloud-based service may be susceptible to improper leakage even if SSL has been properly implemented.

Moreover, the problems that relate to data leaking and documents propagating in a manner that violates policy are not unique to cloud-based services or other threats that may be external to a managed information technology infrastructure. Indeed, many data leakage and document propagation problems arise because authorized employees improperly engage in certain restricted activities, outsiders infiltrate the infrastructure to perform apparently authorized activities, or information technology resources have exploitable vulnerabilities, among other things. For example, many employees like to access their music collections at the workplace, which may raise liabilities such as potential fines or penalties due to users improperly sharing copyrighted content on the network or network degradation because file sharing activity occupies available bandwidth to download content. In another example, many organizations may have sensitive corporate and customer data inadvertently or maliciously disclosed because the sensitive data was "too available" to employees that did not actually require access. However, existing network security systems typically cannot establish a comprehensive inventory to identify particular servers, computers, or other resources that typically host sensitive corporate and customer documents, nor can existing network security systems detect whether network traffic may include sensitive corporate and customer documents in transit, which interferes with the ability to know where sensitive content may be hosted and thereby prevent, detect, and remediate data leakage and document propagation incidents. In particular, almost every resource within a particular network will typically generate various events to describe activity associated with the device, yet correlating events that relate to many devices distributed across a network tends to be very difficult because the events may have different formats, describe different activities, repeat certain events multiple times, or have large volumes that can be difficult to analyze in a useful manner. Furthermore, managing changes and access controls presents important challenges because certain activity patterns may reflect security breaches, compliance issues, or other risks that sensitive data and documents are being leaked or improperly propagated.

Accordingly, network security practitioners and managers are continuously presented with the difficult task to balance tradeoffs between controlling certain risky activities that can be performed on a network without restricting those potentially risky activities to the extent that potentially valuable business opportunities may be disrupted. In the network security context, probabilities are rarely simple, which tends to require network security practitioners to estimate the likelihood that vulnerabilities may be exploited against estimated business benefits that those vulnerabilities may offer. In other words, properly managing a network involves a delicate balance between ensuring that users have the freedom to perform activities that will benefit business while employing measures that can properly prevent, detect, and mitigate the risks that may arise if data or documents leak or otherwise propagate across organizational boundaries in a manner that violates policy. However, existing network security systems tend to fall short in managing these problems due to the complexity involved in suitably classifying all the resources that are hosted on or interact with an information technology infrastructure, identifying where certain files are located in the infrastructure, and detecting atypical deviations that relate to certain files appearing in suspicious places or moving from one location to another.

SUMMARY OF THE INVENTION

According to one aspect of the invention, the system and method described herein may generally use file hashes to track data leakage and document propagation in a network. In particular, the system and method described herein may generally have a management console create various tables or manifests that list file hashes, file names, and paths associated with every file on one or more known reference systems. For example, in one implementation, the management console may generate cryptographic hashes, checksums, or other signatures to uniquely identify the files on the known reference systems based on contents, attributes, or other properties associated therewith. In one implementation, the tables or manifests that list the file hashes, file names, and paths associated with the files on the known reference systems may therefore describe one or more directories or folders and associated contents that provide "ideal" or master sets to baseline subsequent comparisons performed with various matching and analytical algorithms that the management console may run to track data leakage and document propagation in the network. For example, in one implementation, the known reference systems may include one or more computer systems that have been preconfigured to only include default operating system files, valid patches, and other files that are installed (or should be installed) on all devices in the network, which may be compared to files actually installed on other devices in the network to classify the other devices and track data leakage and document propagation in the network.

According to one aspect of the invention, in response to suitably creating the tables or manifests to list the file hashes, file names, and paths that describe the directories or folders and associated contents on the known reference systems, one or more active scanners may then collect information that describes file systems on the various devices in the network. For example, in one implementation, the active scanners may generally transmit packets or other messages to the various devices and subsequently receive response packets or other messages therefrom to collect the information that describes the file systems associated therewith. More particularly, the active scanners may scan the various devices in the network to collect file hashes, file names, and paths that describe every file located on the various devices in addition to directory or folder locations associated therewith. Additionally, the active scanners may scan the devices in the network to collect various attributes, metrics, or other properties associated with the file systems discovered thereon. For example, in one implementation, the collected attributes, metrics, or other properties may include owners, types, keywords, contents, and activities that certain users perform to access, copy, modify, delete, move, or otherwise interact with the files, directories, folders, or other file system contents. Moreover, in one implementation, the active scanners may scan the network to collect external information relating to certain users, including hosts, servers, or other devices that the users frequently access, active directory logins associated with the users, or any other information that may suitably describe activity that the users perform in the network.

According to one aspect of the invention, in response to the active scanners suitably scanning the network to collect the file hashes, file names, and paths that describe the file systems on the various devices located therein and the associated attributes, metrics, properties, and the external user information, the active scanners may return the information collected during the network scan to the management console. In one implementation, the management console may then build various tables or manifests that list the file hashes, file names, and paths associated with the files that the active scanners discovered during the network scan, which may be compared to the tables or manifests that describe the file systems associated with the known reference systems. In particular, the tables or manifests associated with the ideal or master sets may be used to baseline the comparison and identify certain files discovered in the network that are unique to certain users, groups, departments, or other classifications. For example, in one implementation, the management console may run various matching and analytical algorithms that perform additive and subtractive operations to identify the files that are potentially unique to certain classifications. In particular, the additive operations may identify files that appear on a particular device that do not appear on a known reference system compared thereto to identify files that are potentially unique to the user, group, department, or other classification associated therewith, and the subtractive operations may similarly identify files that appear on a known reference system that do not appear on a device compared thereto to detect potentially anomalous deviations from the known reference system. Furthermore, various filters may be employed to reflect the practical reality that file systems discovered on the scanned devices may include files that are not uniquely related to classifications relevant to managing the network.

According to one aspect of the invention, the various matching and analytical algorithms that the management console may run to track data leakage and document propagation in the network may identify file set groups, user file set groups, file set activity rates, directory set activity rates, file set deviations (from a baseline file set), file propagations, and file set propagations, among other things, and further to monitor the network to detect movement or other activities associated with the files, users, and devices that may have significance from audit or security perspectives. For example, the matching and analytical algorithms may generate an audit trail that describes where any particular file was seen, who owned the file at what time, and when certain files were copied, deleted, modified, exported or otherwise accessed to detect statistical anomalies or other deviations that potentially represent network breaches, unauthorized activities, file system drift, policy violations, or other vulnerabilities. Additionally, in one implementation, the management console may run the matching and analytical algorithms using services associated with the active scanners and one or more passive scanners, which may observe or sniff various packets in traffic traversing the network to passively scan and reconstruct communication sessions that relate to activity occurring in the network. For example, the passive scanners may apply various signatures to information in the observed or sniffed traffic to identify certain files, users, devices, or other properties associated with the traffic. Moreover, in one implementation, the management console may include or communicate with a log data source that can receive, aggregate, or otherwise analyze events that the various devices in the network generate to describe activity in the network.

According to one aspect of the invention, the matching and analytical algorithms may identify various properties, attributes, or other characteristics associated with the files discovered on the devices in the network that do not appear on the known reference systems to identify one or more file set groups (e.g., owning users, types, keywords, content, etc.). In particular, the matching and analytical algorithms may generate statistics that summarize certain files having common or matching properties, which may be used to form files that have the common or matching properties into the file set groups. In one implementation, one or more overlay rules may then be applied to further match the owning users to the file set groups and subsequently monitor or otherwise control access to the file set groups. For example, in response to the active scanners, the passive scanners, or the log data source detecting activity that relates to a user accessing or modifying a particular file on a particular device, the overlay rules may be applied to determine whether the activity represents a statistical anomaly (e.g., based on file set groups that the user typically accesses and modifies). As such, in response to determining that the particular file accessed or modified falls within a particular file set group that includes files that the user typically creates, alters, or otherwise interacts with, the management console may not generate an alert, whereas if the statistics indicate that the user has never (or rarely) created or interacted with files in that file set group, the alert may be generated to trigger an investigation into the activity.

According to one aspect of the invention, the matching and analytical algorithms may further identify user file set groups using similar techniques used to identify the file set groups based on external information relating to files that certain users own, active directories logins associated with the users, devices that the users have logged into or frequently access, or other information that suitably describes activity that users normally or typically perform in the network. As such, the matching and analytical algorithms may match certain users with certain file set groups, classifications, or statistics that describe activities that the users normally or typically perform in the network and create user file sets that correlate users to respective file sets, devices, organizational groups or departments, activities, or other classifications. In one implementation, activities that users subsequently perform in the network may then be monitored to detect anomalies or other deviations from the statistics associated with the user file sets. For example, a certain user may be added to members in a particular user file set group if the external information associated with the user includes frequent logins to devices having a certain classification and frequent edits to files classified in a related file set group. Accordingly, if subsequent activity that the user performs in the network matches criteria in a profile associated with the user file set group to which the user was added, the management console would not generate an alert. However, if the subsequent activity relates to the user accessing files or other data in a different user file set group, the management console may generate an alert to indicate that the subsequent activity deviates from the statistics that describe normal or expected activity associated with the user.

According to one aspect of the invention, the matching and analytical algorithms may further identify file set activity rates that include statistics to describe normal or otherwise typical rates at which certain files in the network are changed, copied, moved, exported, or otherwise accessed. As such, in one implementation, activities or information that the active scanners, passive scanners, and log data source subsequently observe in the network may be analyzed to detect potential anomalies or deviations from the normal or typical file set activity rates. In one implementation, the management console may then generate an alert if subsequent activities or information that the active scanners, passive scanners, and log data source observe in the network reveal modification or access activity that represents a deviation from the normal or typical statistics. In one implementation, the statistics that describe the normal or typical file set activity rates may be stored in a database, which may be referenced to analyze whether activities performed on certain files or file sets deviate from the statistics that describe the normal or typical file set activity rates. Furthermore, the statistics that describe the normal or typical file set activity rates may be periodically compared to activities that the active scanners, passive scanners, and/or log data source observe in the network to detect the potential anomalies or deviations from the normal or typical file set activity rates and appropriately update the statistics to reflect actual activity occurring in the network.

According to one aspect of the invention, the matching and analytical algorithms may similarly analyze the files in particular directories or folders that have certain classifications to derive statistics that relate to normal or typical directory set activity rates. In particular, the normal or typical directory set activity rates may describe rates at which the directories or folders are visited or modified, normal or typical activities that users perform when the directories or folders are visited, users that frequently visit or modify the directories or folders, per-directory or per-folder copy frequencies and percentages, per-directory or per-folder access frequencies and percentages, or any other statistics that suitably describe normal or typical activity rates associated with certain directory sets. In one implementation, the management console may similarly store the statistics that describe the normal or typical directory set activity rates in the database, which may be referenced to analyze whether activities subsequently performed on certain directories, folders, or contents associated therewith deviate from normal. Furthermore, the statistics that describe the normal or typical directory set activity rates may be periodically compared to activities observed in the network to detect the potential anomalies or deviations from the normal or typical directory set activity rates and appropriately update the directory set activity rate statistics based on actual activity that occurs in the network.

According to one aspect of the invention, the matching and analytical algorithms may analyze the previously described file hashes, file names, and paths associated with the known reference systems to the file hashes, file names, and paths associated with the devices scanned in the network to detect anomalous file set change events. In particular, the file hashes, file names, and paths associated with the known reference systems may provide the baseline file sets, which the matching and analytical algorithms may compare to devices in the network that have the same or substantially similar directories, folders, directory sets, or folder sets. As such, the management console may then summarize any deviations between the baseline file sets and the same or substantially similar file sets associated with the scanned devices to identify potentially anomalous deviations between the file sets associated with the scanned devices and the baseline file set. For example, if the baseline file set associated with a known reference system includes certain files that are not present in the file sets associated with certain scanned devices, or if the file sets associated with the scanned devices include certain files that are not present in the baseline file set associated with the known reference system, an alert may be generated to indicate that the file systems associated with the scanned devices may have been compromised.

According to one aspect of the invention, the matching and analytical algorithms may further track certain files or file sets to determine whether certain files or file sets have been improperly propagated across the network (e.g., in a manner that deviates from policy, normal or typical activities, etc.). For example, in one implementation, the management console may identify certain files to track in response to determining that hashes, checksums, or other signatures associated therewith appear on several devices in the network and generate an alert if multiple different users own the files having the same hashes, checksums, or other signatures (i.e., because different copies associated with the files on different devices may indicate that the files have been illicitly copied). In another example, the management console may search file systems on devices with certain classifications and generate an alert if the searched file systems include a high count associated with files that have hashes, names, and paths matching files that were classified differently. Furthermore, in one implementation, the files or file sets may be identified and tracked individually, collectively, or selectively based on the particular interest associated therewith from auditing and/or security perspectives. For example, the management console may generate alerts in response to activity that copies tracked files or file sets off designated devices, transmits the tracked files or file sets across the network, or otherwise accesses the tracked files or file sets in a manner that deviates from policy, normal or typical activities, or other audit or security controls.

According to one aspect of the invention, the matching and analytical algorithms may further identify file and file set propagations using one or more particular known data seeds. More particularly, the management console may point the active scanners to a file server or other suitable device in the network and provide the active scanners with a wildcard or other suitable criteria to instruct the active scanners to collect all files from the file server or other suitable device that have satisfy the criteria. For example, in one implementation, the wildcard or other criteria may specify a particular extension to provide the active scanners with a known data seed to identify files having a particular type. As such, the active scanners may be pointed to the file server or other device to collect file hashes corresponding to any files thereon that have satisfy the wildcard criteria provided from the management console and then search other devices in the network to determine whether file systems associated therewith have the same file hashes. Alternatively (or additionally), the active scanners may return the file hashes corresponding to the files that satisfy the wildcard criteria to the management console, which may compare the returned file hashes to the tables or manifests that list the file hashes associated with files discovered on previously scanned devices. In either case, the management console may generate an alert if the file hashes associated with the files that satisfy the wildcard criteria appear in anomalous locations.

Other objects and advantages of the invention will be apparent to those skilled in the art based on the following drawings and detailed description.

DETAILED DESCRIPTION

Figure 1:
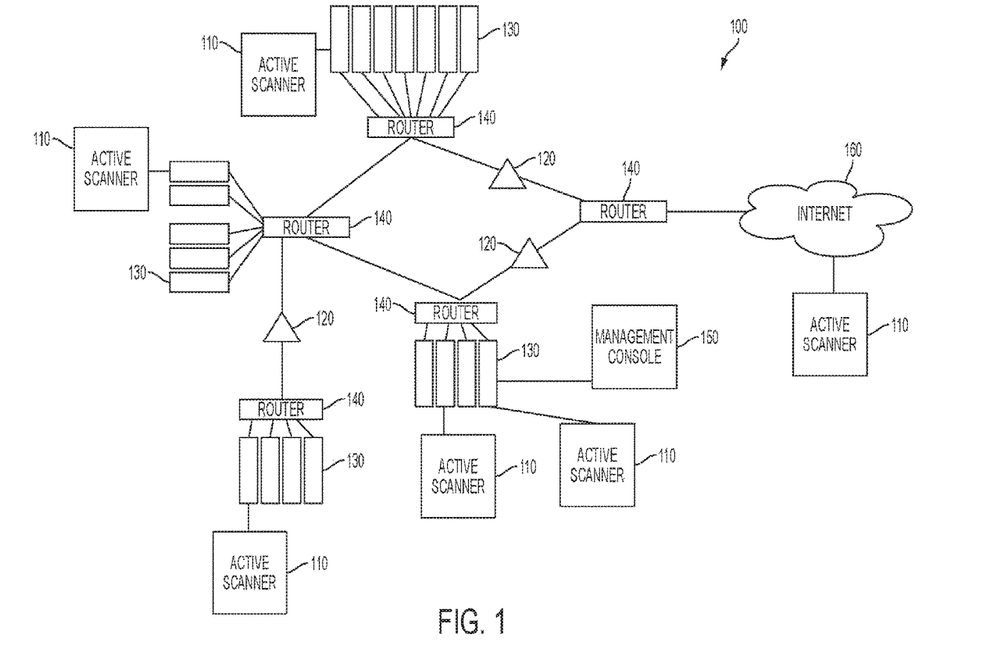
FIG. 1 illustrates an exemplary system that may use file hashes to track data leakage and document propagation in a network, according to one aspect of the invention.

According to one aspect of the invention, FIG. 1 illustrates an exemplary system that may use file hashes to track data leakage and document propagation in a network 100. In one implementation, the system shown in FIG. 1 may generally include, among other things, a management console 150 that may create one or more tables or manifests that list file hashes, file names, and paths associated with every file on one or more known reference systems, wherein the file hashes may include cryptographic hashes, checksums, or other unique signatures associated with the files on the known reference systems. For example, in one implementation, the management console 150 may perform a complete cryptographic hash on every file on the known reference systems to generate the file hashes associated therewith, or the management console 150 may generate the hashes based on file sizes and cryptographic hashes on portions associated with the files on the known reference systems (e.g., performing the cryptographic hashes on a beginning block, an ending block, and one or more selected blocks within the files). In one implementation, the management console 150 may alternatively generate the file hashes using any suitable technique that can generate information to uniquely identify the files on the known reference systems based on contents, attributes, or other properties associated with the files on the known reference systems. In one implementation, the tables or manifests that list the file hashes, file names, and paths associated with the files on the known reference systems may therefore describe one or more directories or folders and contents associated therewith, which may provide "ideal" or master sets that can be used to baseline subsequent comparisons performed with various matching and analytical algorithms to track data leakage and document propagation in the network 100. For example, in one implementation, the known reference systems may include one or more computer systems that have been preconfigured to only include default operating system files, valid patches, and other files that are installed (or should be installed) on all devices 130 in the network 100 (e.g., a Windows 7 computer that information technology personnel preconfigured to only include default Windows 7 operating system files, valid Windows 7 patches, or other files associated with a default installation applicable to every device 130 in the network 100).

In one implementation, in response to suitably creating the tables or manifests to list the file hashes, file names, and paths that describe the directories or folders and associated contents on the known reference systems, one or more active scanners 110 may then collect information that describes file systems on the various devices 130 in the network 100. For example, in one implementation, the active scanners 110 may generally transmit packets or other messages to the various devices 130 and subsequently receive response packets or other messages from the various devices 130 to scan the devices 130 and collect the information that describes the file systems associated therewith. More particularly, in one implementation, the active scanners 110 may scan the various devices 130 in the network 100 to collect file hashes, file names, and paths that describe every file located thereon and directory or folder locations associated with the files located thereon. In one implementation, the file hashes that describe every file located on the various devices 130 may be generated in a substantially similar to the known reference systems (e.g., based on complete cryptographic hashes, partial cryptographic hashes combined with file sizes, or any other suitable technique that can generate information to uniquely identify the files on the various devices 130). Additionally, the active scanners 110 may further scan the various devices 130, which may generally include various user computers, servers, hosts, or other suitable devices 130, to collect various attributes, metrics, or other properties associated with the file systems discovered on the various devices 130. For example, in one implementation, the various collected attributes, metrics, or other properties may include, among other things, owners, types, keywords, contents, and activity (e.g., actions that certain users perform to access, copy, modify, delete, move, or otherwise interact with the files, directories, folders, or other contents associated with the file systems). Moreover, in one implementation, the active scanners 110 may further scan the network 100 to collect external information relating to certain users, which may include hosts, servers, or other devices 130 that certain users frequently access, active directory logins, or any other information that may suitably describe activity that certain users perform in the network 100.

In one implementation, once the active scanners 110 have suitably scanned the network 100 to collect the file hashes, file names, and paths that describe the file systems on the various devices 130 in the network 100, the various attributes, metrics, and other properties associated therewith, and the external information relating to users associated with the network 100, the active scanners 110 may return the information collected during the network scan to the management console 150. As such, in one implementation, the management console 150 may then build various tables or manifests that list the file hashes, file names, and paths associated with the files that the active scanners 110 discovered on the various devices 130 during the network scan, which the management console 150 may compare to the tables or manifests that describe the file systems associated with the known reference systems. In particular, the management console 150 may compare the ideal or master sets represented via the tables or manifests associated with the known reference systems to baseline the comparison and identify certain files discovered on the various devices 130 that are unique to certain users, groups, departments, or other classifications in the network 100. For example, in one implementation, the management console 150 may compare the table or manifest associated with a particular known reference system to the file hashes, file names, and associated paths on similar devices 130 in a particular department to identify files that may potentially be uniquely related to that department (i.e., comparing the table or manifest associated with a Windows 7 reference computer to the file hashes, file names, and associated paths on similar Windows 7 computers in human resources, marketing, accounting, development, and other departments may reveal files that are potentially unique to the human resources, marketing, accounting, development, and other departments).

Accordingly, in one implementation, the management console 150 may generally run various matching and analytical algorithms that perform additive and subtractive operations to compare the tables or manifests associated with the known reference systems to the tables or manifests associated with similar devices 130 scanned in the network 100 to identify various files that are potentially unique to certain users, groups, departments, or other classifications in the network 100. For example, in one implementation, the additive operations may identify certain files that appear on a particular device 130 that do not appear on a known reference system compared thereto, which may represent files that are potentially unique to the owning user, group, department, or other classification associated with the device 130. Similarly, the subtractive operations may identify certain files that appear on a particular known reference system that do not appear on a particular device 130 compared thereto, which may be used to detect potentially anomalous deviations from the ideal or master set that the known reference system represents (e.g., certain files on the known reference system not being present on the device 130 compared thereto may reflect that the operating system installation associated with the device 130 was compromised, that a web server mirror device 130 no longer matches the master web server represented via the known reference system, etc.). Furthermore, in one implementation, the management console 150 may employ various filters in the additive and subtractive operations to reflect the practical reality that the file systems discovered on the scanned devices 130 may include certain files that are not uniquely related to users, groups, departments, or other classifications in the network 100. In particular, the various devices 130 in the network 100 may include personal email files, file caches from browsing the Internet 160, and human resource documents that are sent to every employee or user in the network 100, among other files that are not necessarily relevant to classifications in the network 100. As such, in one implementation, the matching and analytical algorithms that the management console 150 runs may be configured to perform the additive and subtractive operations to identify various devices 130 in the network 100 that have file systems with similar differences relative to the file systems associated with the known reference systems (e.g., files that do not appear on the known reference systems but have high appearance counts and identical hashes, names, and paths on multiple different devices 130).

In one implementation, the following description provides additional detail relating to the matching and analytical algorithms that the management console 150 may run to track data leakage and document propagation in the network 100. More particularly, the matching and analytical algorithms may be used to identify file set groups, user file set groups, file set activity rates, directory set activity rates, file set deviations (from a baseline file set), file propagations, and file set propagations, among other things, wherein the matching and analytical algorithms may be run in various combinations and permutations, whether or not explicitly described. Moreover, in one implementation, the various matching and analytical algorithms may be used to track or otherwise monitor movement or other propagation associated with the files, users, devices 130, and other network information classified therewith and determine whether the monitored movement or propagation has significance from an audit or security perspective. For example, from the audit perspective, the management console 150 may use the various matching and analytical algorithms to generate a trail that describes where any particular file was seen (e.g., devices 130 where a hash associated with the file was observed or discovered), a user or users who owned the file and times when the user or users owned the file, whether and/or when the file was copied, deleted, modified, exported or otherwise accessed. Further, from the security perspective, the management console 150 may use the various matching and analytical algorithms to detect statistical anomalies or other deviations based on whether the monitored movement or propagation potentially represents a network breach, unauthorized activity, file system drift, policy violations, or other vulnerabilities in the network 100.

Additionally, as will be described in further detail below, the management console 150 may run the matching and analytical algorithms using services associated with the active scanners 110 in addition to one or more passive scanners 120, which may generally observe or sniff various packets in traffic traversing the network 100 to passively scan and reconstruct communication sessions that relate to activity occurring in the network 100. For example, in one implementation, the passive scanners 120 may apply various signatures to information in the observed or sniffed traffic to identify certain files, users, devices 130, or other properties associated with the traffic. Furthermore, to observe or sniff the traffic traversing the network 100, the passive scanners 120 may be deployed on or behind one or more hubs 140, spanned switch ports 140, taps 140, choke points 140, routers 140, or other suitable locations in the network 100 that enable the passive scanners 120 to observe network traffic. Moreover, in one implementation, the management console 150 may include (or be in communication with) a log data source (not shown), which may include a correlation engine, a log aggregator, or other suitable data source that can receive, aggregate, or otherwise analyze events from the various devices 130 distributed across the network 100. For example, in one implementation, the log data source may receive, aggregate, or otherwise analyze events that internal or external firewalls 140, routers 140, servers 130, devices 130, operating systems or applications running thereon, or any other suitable source may generate to describe operating system activities, file modification activities, device insertion activities, intrusion attempts, or other network activity.

In one implementation, the matching and analytical algorithms used to identify file set groups may identify various properties, attributes, or other characteristics associated with the files discovered on the devices 130 in the network 100 that do not appear on the known reference systems, wherein the identified properties, attributes, or other characteristics associated with the discovered files may include owning users, types, keywords, content, or other criteria. As such, in one implementation, the management console 150 may use the matching and analytical algorithms to generate statistics that summarize certain files having common or matching properties, attributes, or other characteristics, wherein the management console 150 may use the generated statistics to form the files that have common or matching properties, attributes, or other characteristics into one or more file set groups (e.g., financial statements). In one implementation, the management console 150 may further apply one or more overlay rules to match the owning users to the file set groups and subsequently monitor or otherwise control access thereto. For example, in one implementation, in response to the active scanners 110, the passive scanners 120, or the log data source detecting activity that relates to a particular user accessing or modifying a particular file on a particular device 130 in the network 100, the management console 150 may apply the overlay rules to determine whether the activity represents a statistical anomaly (e.g., based on file set groups that the user typically accesses and modifies). As such, in response to determining that the particular file accessed or modified falls within the "financial statements" file set group, the management console 150 may not trigger an investigation or otherwise generate an alert if the previously generated statistics indicate that the user typically creates, alters, or otherwise interacts with "financial statement" files (whether or not the user initially created the particular file). However, if the statistics indicate that the user has never (or rarely) created or interacted with "financial statement" files, the management console 150 may generate the alert and trigger the investigation in response to the user performing activity to access or modify "financial statement" files. Moreover, in response to the activity modifying, altering, or otherwise changing the file, the component that observed the activity (e.g., the active scanners 110, passive scanners 120, or log data source) may generate a checksum or other hash value associated with the changed file, which may be sent to the management console 150 to update the tables or manifests that describe the file systems associated with the changed file and appropriately update the previously generated tracking analytics associated therewith.

In one implementation, the matching and analytical algorithms used to identify user file set groups may extend the techniques that the matching and analytical algorithms use to identify the file set groups to further identify various user file sets based on external information relating to files that certain users own (e.g., files that the users created, have authorization to access, etc.), active directories, servers, hosts, or other devices 130 in the network 100 that certain users have logged into or frequently access, or other information that suitably describes activity that certain users perform in the network 100. As such, in one implementation, the management console 150 may use the various matching and analytical algorithms to match certain users with certain file set groups, classify the users into different groups, generate statistics that describe activities that the users frequently perform in the network 100, or otherwise correlate users with file sets, devices 130, organizational groups or departments, activities, or other classifications in the network 100. More particularly, in one implementation, the management console 150 may receive the external information used to derive the user file sets from the active scanners 110, the passive scanners, and/or the log data source and then run the matching and analytical algorithms to create user file set statistics that correlate users to respective file sets, devices 130, organizational groups or departments, activities, or other classifications. In one implementation, the management console 150 may then monitor activities that users subsequently perform in the network 100 to detect anomalies or other deviations from the user file set statistics (e.g., based on information or activity that the active scanners 110, passive scanners, and log data source observe in the network 100). For example, in one implementation, the matching and analytical algorithms may add a certain user to members in a "Chief Financial Officer's Office" user file set group if the external information associated with the user includes frequent logins to servers, hosts, or other devices 130 having an "accounting department" classification and frequent edits to files classified in the "financial statements" file set group. Accordingly, if the management console 150 matches subsequent activity that the user performs in the network 100 to criteria in a profile associated with the "Chief Financial Officer's Office" user file set group, the management console 150 would not generate an alert. However, if the subsequent activity relates to the user accessing files or other data in a different user file set group (e.g., "Engineering Source Code"), the management console 150 may generate an alert to indicate that the subsequent activity deviates from the statistics that describe normal or expected activity associated with the user.

In one implementation, the matching and analytical algorithms used to identify file set activity rates may generate statistics that describe normal or otherwise typical rates at which certain files in the network 100 are changed, copied, moved, exported, or otherwise accessed. As such, in one implementation, the management console 150 may analyze activities or information that the active scanners 110, passive scanners 120, and log data source subsequently observe in the network 100 to detect potential anomalies or deviations from the normal or typical file set activity rates. For example, in one implementation, the statistics that describe the normal or typical file set activity rates may indicate that individual files in the "financial statements" file set group are changed or modified once per month on average, that the total files in the "financial statements" file set group are rarely moved from one location to another, and that the total files in the "financial statements" file set group are rarely or infrequently edited. As such, the management console 150 may then generate an alert in response to subsequent activities or information that the active scanners 110, passive scanners 120, and log data source observe in the network 100 revealing modification or access activity that represents a sudden increase or other deviation from the normal or typical statistics (e.g., daily modifications to an individual file, activity that moves or copies all the files in the "financial statements" file set group to another location, etc.). In one implementation, the management console 150 may store the statistics that describe the normal or typical file set activity rates in a database, which the management console 150 may reference to analyze whether activities performed on certain files or file sets deviate from the statistics that describe the normal or typical file set activity rates. Further, in one implementation, the management console 150 may periodically compare the statistics that describe the normal or typical file set activity rates to activities that the active scanners 110, passive scanners 120, and/or log data source observe in the network 100 to detect the potential anomalies or deviations from the normal or typical file set activity rates and update the file set activity rate statistics to reflect actual activity occurring in the network 100 at a particular time.

In one implementation, the matching and analytical algorithms may similarly analyze the files in particular directories or folders that have certain classifications to derive statistics that relate to normal or typical directory set activity rates. In particular, the normal or typical directory set activity rates may describe rates at which the directories or folders are visited or modified, normal or typical activities that users perform when the directories or folders are visited, users that frequently visit or modify the directories or folders, per-directory or per-folder copy frequencies and percentages, per-directory or per-folder access frequencies and percentages, or any other statistics that suitably describe normal or typical activity rates associated with certain directory sets. For example, the statistics may indicate that the directory "\\mjr\product-docs" has a low visitation rate, the user "mjr" represents the only user that normally visits the directory, and that user "mjr" typically views only one file when visiting the directory. As such, the management console 150 may generate an alert if a user that has never visited the directory before (e.g., a user other than "mjr") suddenly does so, if the user other than "mjr" copies, edits, or modifies the directory or files contained therein, if the user "mjr" copies, edits, or modifies the directory or contents associated therewith in a manner that deviates from the normal or typical rates, or if any other activities performed in connection with the directory or the contents associated therewith are anomalous or otherwise deviate from the normal or typical statistics. In one implementation, the management console 150 may further store the statistics that describe the normal or typical directory set activity rates in the database and reference the statistics to analyze whether activities performed on certain directories, folders, or contents associated therewith deviate from normal (e.g., based on a ratio between the total files in a particular directory or folder and how many files in the directory or folder were copied, edited, or modified). Furthermore, the management console 150 may similarly compare the statistics that describe the normal or typical directory set activity rates to activities observed in the network 100 to periodically detect the potential anomalies or deviations from the normal or typical directory set activity rates and update the directory set activity rate statistics to reflect actual activity that occurs in the network 100.

In one implementation, the matching and analytical algorithms used to identify file set deviations relative to the baseline file set may analyze the previously described file hashes, file names, and paths associated with certain known reference systems to file hashes, file names, and paths associated with certain devices 130 scanned in the network 100 to detect anomalous file set change events. In particular, the file hashes, file names, and paths associated with certain known reference systems may provide the baseline file sets, which may generally include one or more directories, folders, directory sets, folder sets, and various files contained therein. In one implementation, the matching and analytical algorithms may then identify certain devices 130 scanned in the network 100 that have the same or substantially similar directories, folders, directory sets, or folder sets, wherein the files contained in the directories, folders, directory sets, or folder sets associated with the scanned devices 130 may be compared to the same or substantially similar baseline file sets. As such, the management console 150 may then summarize any deviations between the baseline file sets and the same or substantially similar file sets associated with the scanned devices 130 (e.g., statistically, in detailed lists, etc.). Accordingly, in one implementation, the management console 150 may analyze the deviations between the baseline file sets and the same or substantially similar file sets associated with the scanned devices 130 to identify potentially anomalous deviations between the file sets associated with the scanned devices 130 and the baseline file set. For example, if the baseline file set associated with a known reference system that represents a default operating system installation includes certain files that are not present in the file sets associated with certain scanned devices 130, the deviation may indicate that a required patch needs to be installed on the scanned devices 130, that users associated with the scanned devices 130 have tampered with the operating system installation, or that the operating system installation associated with the scanned devices 130 has otherwise been compromised. In another example, the baseline file set may be associated with a master web server that stores various files that should be similarly stored on every web server mirror 130 associated therewith, whereby the management console 150 may determine that one or more web server mirrors 130 no longer match the master web server if any files appearing in the baseline file set do not appear in the file set associated with the one or more web server mirrors 130, or alternatively if any files appearing in the file set associated with the one or more web server mirrors 130 do not appear in the baseline file set (i.e., because the master web server and the web server mirrors 130 should be identical to one another).

In one implementation, the matching and analytical algorithms used to identify file and file set propagations may track certain files or file sets to determine whether the files or file sets have potentially propagated across the network 100 in a manner that deviates from policy, from normal or typical activities, or other ways that may be significant from audit or security perspectives. For example, in one implementation, the management console 150 may identify a certain file to track in response to determining that the hash, checksum, or other signature associated therewith appears on several devices 130 in the network 100, wherein one or more alerts may be generated if multiple different users own the file having the hash, checksum, or other signature associated therewith (i.e., because different users owning different copies associated with the file on different devices 130 may indicate that the file has been illicitly copied or otherwise propagated in the network 100). In another example, the management console 150 may search file systems on certain devices 130 classified into DNS server or development groups and generate an alert if the searched file systems include a high count associated with files that have hashes, names, and paths matching files that were classified in an accounting group (e.g., due to being uniquely associated with devices 130 classified in the accounting group based on previous comparisons to the known reference systems). Further, in one implementation, a certain file or file set may be identified and tracked individually, collectively, or selectively based on the file or file set having significant interest (e.g., because the file or file set includes sensitive data, intellectual property, or otherwise has particular relevance that merits tracking the file or file set from audit or security perspectives). As such, the management console 150 may then generate an alert in response to activity that copies the tracked file or file set off a designated device 130, transmits the tracked file or file set across the network 100, or otherwise accesses the tracked file or file set in a manner that deviates from policy, normal or typical activities, or other audit or security controls.

In one implementation, the matching and analytical algorithms may further identify file and file set propagations using one or more particular known data seeds. More particularly, the management console 150 may point the one or more active scanners 110 to a file server or other suitable device 130 in the network 100 and provide the active scanners 110 with a wildcard or other suitable criteria relating to the known data seeds, wherein the wildcard or other criteria relating to the known data seeds may instruct the active scanners 110 to collect all files from the file server or other suitable device 130 that have a particular extension and then search other devices 130 in the network 100 to identify files that have the same extension. For example, in one implementation, the wildcard or other suitable criteria may specify a ".c" extension to provide the active scanners 110 with a known data seed that can be used to identify files containing source code written in the C programming language. As such, in one implementation, the active scanners 110 may be pointed to the file server or other device 130 to collect file hashes corresponding to any files thereon that have a particular extension or satisfy other wildcard criteria provided from the management console 150 and then search any other device (or devices) 130 in the network 100 to determine whether file systems associated therewith have the same file hashes. Alternatively (or additionally), the active scanners 110 may return the file hashes corresponding to the files that have the particular extension or satisfy the other wildcard criteria to the management console 150, which may compare the file hashes returned from the active scanners 110 to the tables or manifests that list the file hashes associated with files discovered on the devices 130 that were previously scanned. In either case, the management console 150 may generate an alert in response to determining that the file hashes associated with the files that satisfy the wildcard criteria appear in anomalous locations (e.g., if the wildcard specifies the ".c" extension to identify C source code files, devices 130 classified into a development group may be expected to have files with matching file hashes, whereas high counts on non-user workstations or non-engineering workstations would not be expected and therefore cause an alert to be generated).

In one implementation, further detail relating to the features and functionality associated with the system shown in FIG. 1 and described above may be provided in U.S. patent application Ser. No. 10/863,238, entitled "System and Method for Managing Network Vulnerability Analysis Systems," which issued as U.S. Pat. No. 7,926,113 on Apr. 12, 2011, U.S. patent application Ser. No. 11/016,761, entitled "System and Method for Scanning a Network," which issued as U.S. Pat. No. 7,761,918 on Jul. 20, 2010, U.S. patent application Ser. No. 11/313,710, entitled "System and Method for Managing Events," filed Dec. 22, 2005, U.S. patent application Ser. No. 12/693,803, entitled "System and Method for Correlating Network Identities and Addresses," filed Jan. 26, 2010, U.S. patent application Ser. No. 12/695,659, entitled "System and Method for Enabling Remote Registry Service Security Audits," filed Jan. 28, 2010, U.S. patent application Ser. No. 12/729,036, entitled "System and Method for Passively Identifying Encrypted and Interactive Network Sessions," filed Mar. 22, 2010, and U.S. patent application Ser. No. 12/775,120, entitled "System and Method for Three-Dimensional Visualization of Vulnerability and Asset Data," filed May 6, 2010, the contents of which are hereby incorporated by reference in their entirety.

Figure 2:
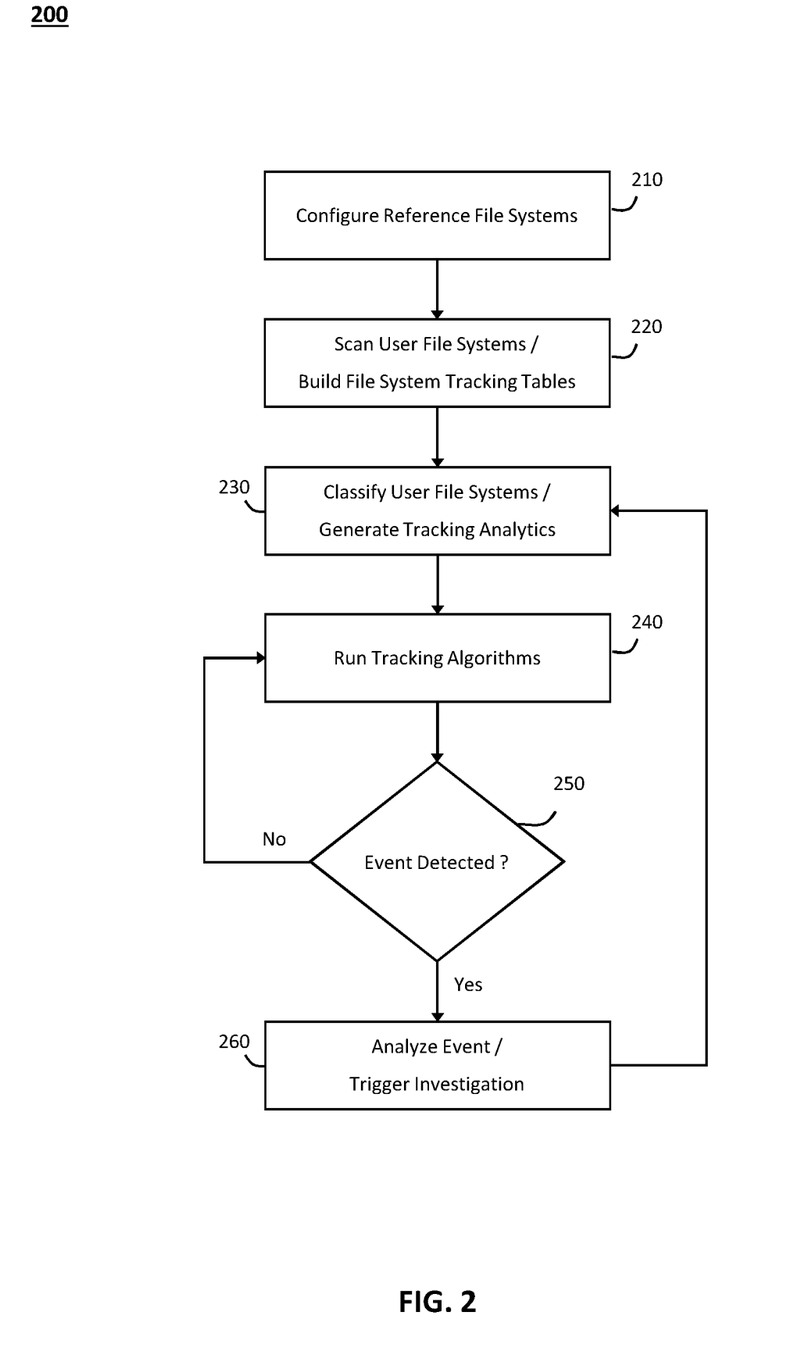
FIG. 2 illustrates an exemplary method that may use file hashes to classify user systems and generate analytics to track data leakage and document propagation in a network, according to one aspect of the invention.

According to one aspect of the invention, FIG. 2 illustrates an exemplary method 200 that may use file hashes to classify user systems and generate analytics to track data leakage and document propagation in a network. In particular, the method 200 illustrated in FIG. 2 may include a management console configuring one or more known reference systems in an operation 210, which may further include the management console creating one or more tables or manifests that list file hashes, file names, and paths associated with every file on the reference systems. For example, in one implementation, the management console may perform a complete cryptographic hash on every file on the known reference systems to generate the file hashes associated therewith or the hashes may be generated based on file sizes and cryptographic hashes on portions associated with the files or any other technique that can suitably generate information to uniquely identify the files on the known reference systems. In one implementation, the tables or manifests that list the file hashes, file names, and paths associated with the files on the known reference systems configured in operation 210 may therefore describe one or more directories or folders and associated contents that provide "ideal" or master sets that can be used to baseline subsequent comparisons that various matching and analytical algorithms may perform to track data leakage and document propagation in the network. For example, in one implementation, the known reference systems configured in operation 210 may include one or more computer systems that have been preconfigured to only include default operating system files, valid patches, and other files that are installed or should be installed on all devices in the network (e.g., a Windows 7 computer that information technology personnel preconfigured to only include default Windows 7 operating system files, valid Windows 7 patches, or other files associated with a default installation applicable to every device in the network).

In one implementation, in response to suitably creating the tables or manifests to list the file hashes, file names, and paths that describe the directories or folders and associated contents on the known reference systems, an operation 220 may include one or more active scanners collecting information that describes file systems on various devices in the network. For example, operation 220 may include the active scanners transmitting packets or other messages to the various devices in the network and subsequently receiving response packets or other messages that provide information that describes the file systems associated therewith. As such, in one implementation, the active scanners may scan the various devices in operation 220 to collect file hashes, file names, and paths that describe every file located thereon and directory or folder locations associated with the files located thereon, wherein the file hashes associated with the files on the scanned devices may be generated in a substantially similar to the known reference systems. Additionally, the active scanners may further scan the various devices in operation 220 to collect various attributes, metrics, or other properties associated with the file systems discovered on the various devices (e.g., owners, types, keywords, contents, and activities associated with the file systems) and external information relating to certain users (e.g., hosts or servers that certain users frequently access, active directory logins associated with certain users, etc.).

In one implementation, in response to the active scanners having suitably scanned the network, operation 220 may further include the active scanners returning the information collected during the network scan to the management console, which may then build various tables or manifests that list the file hashes, file names, and paths associated with the files that the active scanners discovered in the network scan. In one implementation, the management console may then compare the information returned from the active scanners to the tables or manifests that describe the file systems associated with the known reference systems to build file system tracking tables associated with the various scanned devices. In particular, operation 220 may include the management console comparing the ideal or master sets represented via the tables or manifests associated with the configured known reference systems to baseline the comparison and identify certain files discovered on the various devices that are unique to certain users, groups, departments, or other classifications in the network. For example, in one implementation, the table or manifest associated with a particular known reference system may be compared to the file hashes, file names, and associated paths on similar devices in a particular department to identify files that may potentially be uniquely related to that department (i.e., comparing the table or manifest associated with a Windows 7 reference computer to the file hashes, file names, and associated paths on similar Windows 7 computers in various departments may reveal files that are potentially unique to those departments).

As such, in one implementation, the management console may then run various matching and tracking algorithms in an operation 230 to classify the file systems associated with the scanned devices and generate tracking analytics to subsequently detect potential data leakage and document propagation in the network. For example, in one implementation, the matching and analytical algorithms may perform various additive and subtractive operations in operation 230 to compare the tables or manifests associated with the known reference systems to the tables or manifests associated with similar devices scanned in the network to identify various files that are potentially unique to certain users, groups, departments, or other classifications in the network. In particular, the additive operations may identify certain files that appear on a particular device that do not appear on a known reference system compared thereto, which may represent files that are potentially unique to the owning user, group, department, or other classification associated with the device. Similarly, the subtractive operations may identify certain files that appear on a particular known reference system that do not appear on a particular device compared thereto, which may be used to detect potentially anomalous deviations from the ideal or master set that the known reference system represents. In one implementation, operation 230 may further employ various filters in the additive and subtractive operations to reflect the practical reality that the file systems discovered on the scanned devices may include certain files that are not uniquely related to users, groups, departments, or other classifications in the network (e.g., personal email files, Internet browsing caches, and other files that are not necessarily relevant to classifying the user file systems or generating the tracking analytics).

In one implementation, as will be described in further detail below in connection with FIG. 3, an operation 240 may then include the management console running the matching and analytical algorithms in a tracking context to detect activity that relates to potential data leakage and document propagation in the network. More particularly, operation 240 may run the matching and analytical algorithms in various combinations and permutations to identify various file set groups, user file set groups, file set activity rates, directory set activity rates, file set deviations from a baseline file set, file propagations, and file set propagations to track or otherwise monitor movement or other propagation associated with the files and the users, devices, and other network classifications associated therewith. In one implementation, an operation 250 may then include the management console determining whether the monitored movement or propagation has significance from an audit or security perspective. For example, in response to determining that certain movement or propagation events have significance from an audit or security perspective, the management console may use the various matching and analytical algorithms in an operation 260 to analyze the movement or propagation events (e.g., to generate a trail that describes where files associated with the events were seen, moved, accessed, or otherwise interacted with, users who owned the files associated with the events and times when the user or users owned the files, whether and/or when the files were copied, deleted, modified, exported or accessed, etc.). Further, from the security perspective, the management console may use the various matching and analytical algorithms to detect statistical anomalies or other deviations based on whether the monitored movement or propagation potentially represents a network breach, unauthorized activity, file system drift, policy violations, or other vulnerabilities in the network, in which case operation 260 may include the management console 260 triggering an investigation into the activity that represents potential data leakage or document propagation. Further, in one implementation, the method 300 may return to operation 230 to appropriately update any previously created classifications and tracking analytics based on relevant movement or propagation events detected in operation 250, and moreover, the method 300 may continue to run the tracking algorithms in operations 240 to monitor activity in the network and detect additional events that relate to potential data leakage or document propagation.

Figure 3:
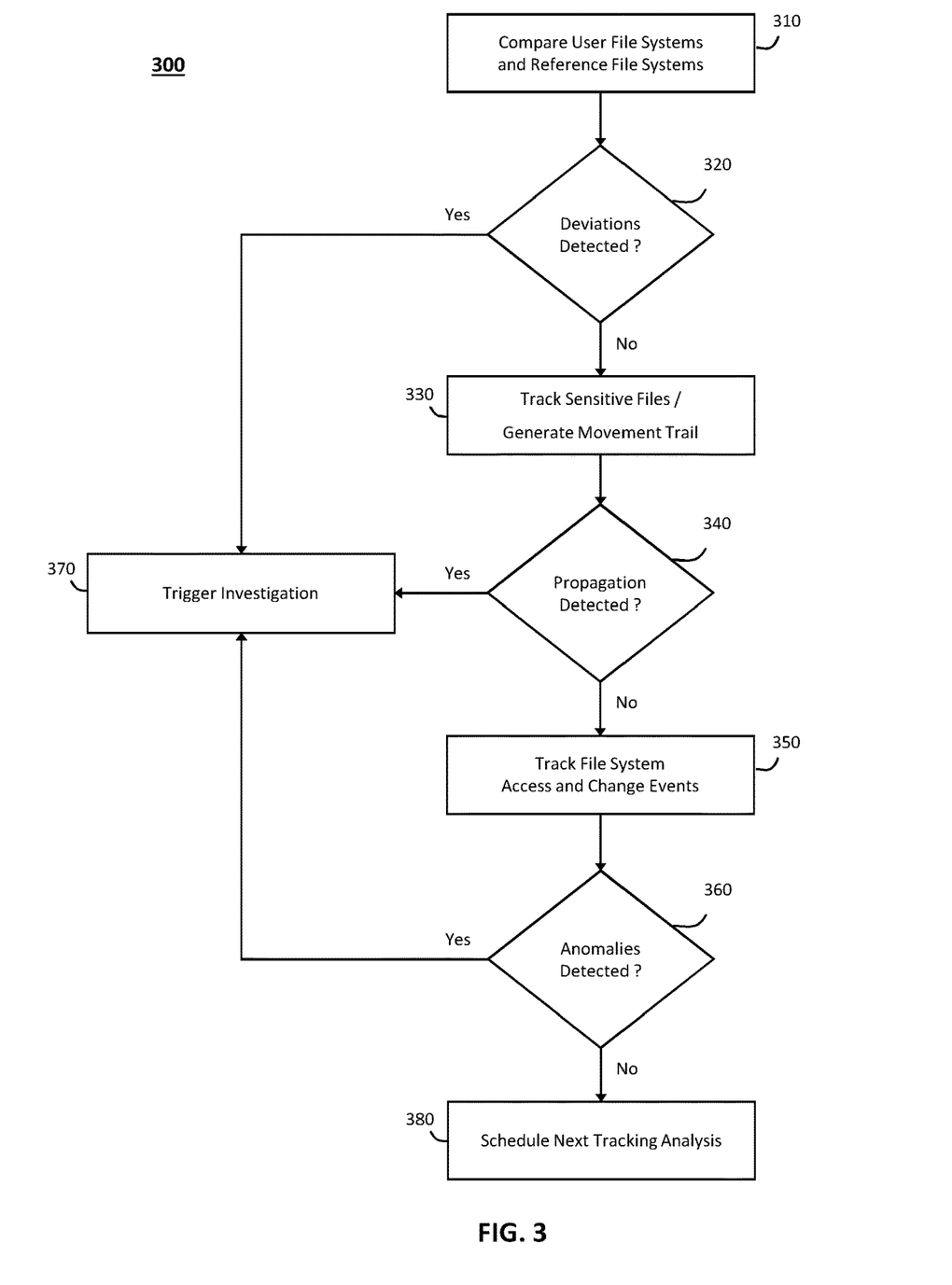
FIG. 3 illustrates an exemplary method that may use file hashes, user system classifications, and related analytics to track data leakage and document propagation in a network, according to one aspect of the invention.

According to one aspect of the invention, FIG. 3 illustrates an exemplary method 300 that may use file hashes, user system classifications, and related analytics to track data leakage and document propagation in a network. In particular, the method 300 illustrated in FIG. 3 may generally be performed periodically (e.g., at scheduled intervals), in response to certain conditions (e.g., a security or compliance audit), or at any other suitable time to evaluate potential data leakage or document propagation in the network.

In one implementation, the method 300 shown in FIG. 3 may include executing one or more matching or analytical algorithms in an operation 310, wherein the matching or analytical algorithms executed in operation 310 may compare one or more user file systems discovered on devices associated with the network to one or more reference file systems associated with one or more known reference systems, which have been described in further detail above. For example, in one implementation, the matching or analytical algorithms executed in operation 310 may identify deviations in the user file systems relative to a baseline file set, which may include analyzing the previously described file hashes, file names, and paths associated with the known reference systems to file hashes, file names, and paths associated with the devices scanned in the network to detect anomalous file set change events. In particular, the file hashes, file names, and paths associated with the known reference systems may describe one or more directories, folders, directory sets, folder sets, and various files associated with the baseline file sets. In one implementation, the matching or analytical algorithms executed in operation 310 may then identify certain devices scanned in the network that have the same or substantially similar directories, folders, directory sets, or folder sets to the baseline file sets and compare the files in the directories, folders, directory sets, or folder sets associated with the scanned devices to the same or substantially similar baseline file sets. As such, an operation 320 may then include a management console determining whether any deviations exist between the baseline file sets and the same or substantially similar file sets associated with the scanned devices, wherein the management console may trigger alert in an operation 370 to investigate any potential deviations that were detected in operation 320.

In particular, operation 320 may include the management console analyzing any deviations that may have been detected between the baseline file sets and the same or substantially similar file sets associated with the scanned devices to determine whether the detected deviations are potentially anomalous, represent potential data leakage, or otherwise have auditing or security significance. For example, if the baseline file set associated with a known reference system that represents a default operating system installation includes certain files that are not present in the file sets associated with certain scanned devices (i.e., the user file systems), operation 370 may include the management console triggering an alert to investigate whether the deviation indicates that a required patch needs to be installed on the scanned devices, that users associated with the scanned devices have tampered with the operating system installation, or that the operating system installation associated with the scanned devices has otherwise been compromised. In another example, the baseline file set may be associated with a master web server that stores various files that should be similarly stored on every web server mirror associated therewith, whereby the alert triggered in operation 370 may be analyzed to investigate whether one or more web server mirrors no longer match the master web server if any files appearing in the baseline file set do not appear in the file set associated with the one or more web server mirrors or vice versa (i.e., because the master web server and the web server mirrors should be identical to one another). Furthermore, operation 370 may include the management console summarizing the detected deviations statistically, in detailed lists, or in any other way to suitably enable the investigation into the deviations between the user file systems and the known reference file systems.

In one implementation, the matching or analytical algorithms may be further executed in an operation 330 to track sensitive files and generate movement trails associated therewith. For example, in one implementation, operation 330 may include the management console pointing one or more active scanners to a file server or other suitable device in the network and providing the active scanners with one or more wildcards, criteria, or other suitable data seeds (e.g., a particular file extension). As such, the active scanners may use the data seeds provided from the management console in operation 330 to identify all files on the file server or other device that the management console pointed to that satisfy the criteria associated with the data seed and then search other devices in the network to identify files that further satisfy the criteria associated with the data seed. For example, in one implementation, the data seed may include a wildcard or other suitable criteria that specifies a ".c" extension, which may cause the active scanners to identify any files on the file server or other suitable device that contain source code written in the C programming language. As such, operation 330 may include the active scanners collecting file hashes corresponding to any identified files that satisfy the criteria associated with the data seed and then searching file systems associated with other devices in the network to detect any files that have the same file hashes. Alternatively (or additionally), the active scanners may return the file hashes corresponding to the files that satisfy the criteria associated with the data seed to the management console, which may then compare the file hashes returned from the active scanners to tables or manifests that list the file hashes associated with files discovered on devices in the network that were previously scanned. In either case, an operation 340 may include the management console determining whether any matches between the file hashes associated with the files identified on the file server or other device and the file hashes associated with the files on the user file systems represent potentially improper propagation in the network. As such, in one implementation, the management console may generate an alert in operation 370 in response to operation 330 resulting in a determination that the file hashes associated with the files that satisfy the criteria associated with the data seeds appear in anomalous location. For example, if the data seeds specify the ".c" extension to identify C source code files, devices classified into a development group may be expected to have files with matching file hashes, whereby operation 340 would not generate an alert or otherwise trigger an investigation if the only devices with matching file hashes are classified into the development group. However, non-user workstations or non-engineering workstations would not be expected to have matching file hashes, whereby an alert may be generated to trigger an investigation in operation 370 if non-user or non-engineering workstations include files that have hashes matching the hashes associated with the files having the ".c" extension.

In one implementation, the matching or analytical algorithms executed in operation 330 may further track certain files or file sets that may be sensitive or otherwise important from auditing or security perspectives to determine whether the files or file sets have potentially propagated across the network in a manner that deviates from policy, normal or typical activities, or in other ways significant to auditing or security controls. For example, in one implementation, operation 330 may include tracking certain files that have hashes, checksums, or other signatures appearing on several devices in the network, in which case operation 340 may then determine whether multiple different owners are associated with the files that have the same hashes, checksums, or other signatures on the different devices. As such, operation 370 may then generate an alert to trigger an investigation into potential propagation if multiple different users own the files having the same hashes, checksums, or other signatures because different users owning different copies thereof on different devices may indicate that the file has been illicitly copied or otherwise propagated in the network. In another example, operations 330 and 340 may include searching file systems on certain devices having certain classifications, which may result in operation 370 generating an alert if the searched file systems include a high count associated with files that have hashes, names, and paths matching files that have different classifications. Further, in one implementation, certain files or file sets may be identified and tracked individually, collectively, or selectively based on the specific auditing, security, or other interest associated with the files or file sets, wherein operation 370 may generate an alert if activity copies the tracked files or file sets off designated devices, transmits the tracked files or file sets across the network, or otherwise accesses the tracked files or file sets in a manner that deviates from policy, normal activities, or other controls.

In one implementation, the matching or analytical algorithms may be further executed in an operation 350 to track file system access and change events. For example, in one implementation, operation 350 may include the matching or analytical algorithms identifying various properties, attributes, or other characteristics associated with the files discovered on the devices scanned in the network that do not appear on the known reference systems (e.g., owning users, types, keywords, content, etc.). As such, in one implementation, the matching or analytical algorithms may then generate statistics that summarize certain files having common or matching characteristics in operation 350, wherein the management console may use the generated statistics to form the files that have the common or matching characteristics into one or more file set groups (e.g., financial statements). In one implementation, the management console may further apply one or more overlay rules in operation 350 to match the owning users to the file set groups, which may be used to subsequently monitor or otherwise control access thereto in an operation 360. For example, in one implementation, in response to the active scanners, one or more passive scanners, or a log data source detecting activity that relates to a particular user accessing or modifying a particular file on a particular device in the network, the overlay rules may be applied in operation 360 to determine whether the activity represents a statistical anomaly (e.g., based on file set groups that the user typically accesses and modifies). As such, in response to determining that the particular file accessed or modified falls within the "financial statements" file set group and the previously generated statistics indicate that the user typically creates, alters, or otherwise interacts with "financial statement" files, operation 360 would not generate an alert or otherwise trigger an investigation. However, if the statistics indicate that the user has never (or rarely) created or interacted with "financial statement" files and the activity relates to the user accessing or modifying "financial statement" files, operation 370 may generate the alert to trigger the investigation. Moreover, in response to the activity modifying, altering, or otherwise changing the file, a checksum or other hash value associated with the changed file may be generated and used in operation 350 to update the file system access and change statistics associated therewith.

Additionally, in one implementation, operation 350 may further extend the techniques used to identify the file set groups to further identify various user file sets based on external information relating to certain users (e.g., files that the users created, files that the users have authorization to access, active directories, servers, hosts, or other devices that the users have logged into or frequently access, etc.). As such, in one implementation, operation 350 may further include the matching or analytical algorithms matching certain users with certain file set groups, classifying the users into different groups, generating statistics that describe activities that the users frequently perform in the network, or otherwise correlating users with file sets, devices, groups, departments, activities, or other network classifications. More particularly, the management console may use the external information in operation 350 to derive user file set statistics that correlate certain users to respective file sets, devices, groups, departments, activities, or other classifications, and operation 360 may include the management console monitoring activities that users subsequently perform in the network to detect anomalies or other deviations from the user file set statistics. For example, operation 350 may include the matching or analytical algorithms adding a certain user to members in a particular group (e.g., "Chief Financial Officer's Office") if the external information associated with the user includes frequent logins to servers, hosts, or other devices classified in that group (e.g., an "accounting department") and frequent edits to files similarly classified (e.g., "financial statements" files). Accordingly, if operation 360 results in the management console matching subsequent activity that the user performs in the network to criteria in a profile associated with the user file set group in which the user has membership, operation 370 would not generate an alert or otherwise trigger an investigation. However, if the subsequent activity relates to the user accessing files or other data in a different user file set group (e.g., "Engineering Source Code"), operation 370 may generate an alert to trigger an investigation into the subsequent activity that deviated from the statistics that describe the normal or expected user activity.

Furthermore, in one implementation, operation 350 may identify various file set activity rates to generate statistics that describe normal or typical rates at which certain files in the network are changed, copied, moved, exported, accessed or otherwise used. In this context, operation 360 may include analyzing activities or information observed in the network to detect potential anomalies or deviations from the normal or typical file set activity rates. For example, the statistics that describe the normal or typical file set activity rates may indicate that individual files in the "financial statements" file set group are changed or modified once per month on average, that the total files in the "financial statements" file set group are rarely moved from one location to another, and that the total files in the "financial statements" file set group are rarely or infrequently edited. As such, operation 370 may then generate an alert in response to subsequent activities in the network modifying or accessing certain files or file sets in a manner that represents a sudden increase or other deviation from the normal or typical statistics (e.g., daily modifications to an individual file, moving or copying all the files in the "financial statements" file set group to another location, etc.). Furthermore, in one implementation, the statistics that describe the normal or typical file set activity rates may be periodically compared to activities observed in the network to appropriately update the file set activity rate statistics to reflect actual activity occurring in the network.

In one implementation, operation 350 may similarly include the matching or analytical algorithms analyzing the files in particular directories or folders that have certain classifications to derive statistics that relate to normal or typical directory set activity rates. In particular, the normal or typical directory set activity rates may describe rates at which the directories or folders are visited or modified, normal or typical activities that users perform when the directories or folders are visited, users that frequently visit or modify the directories or folders, per-directory or per-folder copy frequencies and percentages, per-directory or per-folder access frequencies and percentages, or any other statistics that suitably describe normal or typical activity rates associated with certain directory sets. For example, the statistics may include visitation rates associated with certain directories, users that normally visit or otherwise access the directories, and activities that the users typically perform visiting the directories. As such, the management console may generate an alert to trigger an investigation in operation 370 if a user that has never previously visited a certain directory does so, if any user (including those that normally visit or access the directory) copies, edits, or modifies the directory or contents associated therewith in a manner that deviates from the normal or typical rates, or if any other activities performed in connection with the directory or the contents associated therewith are anomalous or otherwise deviate from the normal or typical statistics. Further, in one implementation, the statistics that describe the normal or typical directory set activity rates may similarly compared to activities observed in the network to periodically and appropriately update the directory set activity rate statistics to reflect actual activity occurring in the network.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for facilitating data leakage and/or propagation tracking on a network, comprising:
    a computer system one or more processors programmed to execute computer program instructions that, when executed, cause the computer system to:
        obtain a set of hashes that are associated with files of a user system, and a reference set of hashes that are associated with files of a reference system;
        determine an additional subset of hashes included in the set of hashes and not included in the reference set of hashes based on a comparison between the set of hashes and the reference set of hashes;
        predict that a file is exclusive for one or more users or exclusive for one or more user systems, the file being associated with a hash included in the additional subset of hashes;
        scan one or more other user systems to determine what files are on the other user systems, wherein each of the other user systems is assigned to one or more other users or is not one of the user systems; and
        generate an alert indicating unauthorized activity, wherein the alert is generated responsive to the scan indicating that the other user systems contain the file predicted to be exclusive for the users or exclusive for the user systems.

2. The system of claim 1, wherein the computer system is caused to:
    obtain a set of names or paths that are associated with the files of the user system;
    obtain a reference set of names or paths associated with the files of the reference system; and
    determine an additional subset of names or paths included in the set of names or paths and not included in the reference set of names or paths based on a comparison between the set of names or paths and the reference set of names or paths,
    wherein predicting the file as being exclusive for the users or exclusive for the user systems is further based on the additional subset of names or paths.

3. The system of claim 1, wherein the computer system is caused to:

obtain a set of names and paths that are associated with the files of the user system;

obtain a reference set of names and paths associated with the files of the reference system; and determine an additional subset of names and paths included in the set of names and paths and not included in the reference set of names and paths based on a comparison between the set of names and paths and the reference set of names and paths, wherein predicting the file as being exclusive for the users or exclusive for the user systems is further based on the additional subset of names and paths.

4. The system of claim 1, wherein the computer system is caused to:

observe traffic associated with the network to detect activity that changed, copied, moved, or accessed one or more files on user systems of the network; and generate, based on the detected activity, an audit trail associated with the files that were changed, copied, moved, or accessed, wherein the audit trail includes information to describe (i) one or more of the user systems at which the detected activity was observed, (ii) at least one user that owned the files associated with the detected activity, (iii) times when the users owned the files associated with the detected activity, and (iv) the detected activity.

5. The system of claim 1, wherein the computer system is caused to:

obtain, based on the scan, hashes associated with files that are on the other user systems; and generate the alert responsive to a determination that at least one of the hashes obtained based on the scan matches the hash associated with the file predicted to be exclusive for the users or exclusive for the user systems.

6. The system of claim 1, wherein the computer system is caused to:

generate the alert responsive to a determination that one or more files of a set of user systems of the network have different owners on more than one user system of the set of user systems.

7. The system of claim 1, wherein the computer system is caused to:

identify one or more files or file sets having auditing or security significance, wherein one or more systems of the network are designated to store the files or file sets having the auditing or security significance; and generate the alert responsive to a determination that the files or file sets have been copied or moved off of the designated systems.

8. The system of claim 1, wherein the computer system is caused to:

generate statistics that describe normal activities that at least one user perform to interact with at least some files of the user systems; and generate the alert responsive to a determination that interactions with the at least some files of the user systems deviate from the statistics describing the normal activities that the users perform to interact with the at least some files of the user systems.

9. The system of claim 1, wherein the computer system is caused to:

generate statistics that describe normal activities that at least one user perform to interact with one or more directories or folders that contain at least some files of the user systems; and generate the alert responsive to a determination that interactions with the directories or folders deviate from the statistics describing the normal activities that the users perform to interact with the directories or folders.

10. The system of claim 1, wherein the set of hashes associated with the files of the user system comprises one or more of checksums, complete cryptographic hashes, or partial cryptographic hashes.

11. A method for facilitating data leakage and/or propagation tracking on a network, the method being implemented on a computer system that includes one or more processors executing computer program instructions that, when executed, perform the method, the method comprising:

obtaining a set of hashes that are associated with files of a user system, and a reference set of hashes that are associated with files of a reference system;

determining an additional subset of hashes included in the set of hashes and not included in the reference set of hashes based on a comparison between the set of hashes and the reference set of hashes;

predicting that a file is exclusive for one or more users or exclusive for one or more user systems, the file being associated with a hash included in the additional subset of hashes;

scanning one or more other user systems to determine what files are on the other user systems, wherein each of the other user systems is assigned to one or more other users or is not one of the user systems; and generating an alert indicating unauthorized activity, wherein the alert is generated responsive to the scan indicating that the other user systems contain the file predicted to be exclusive for the users or exclusive for the user systems.

12. The method of claim 11, further comprising:

obtaining a set of names or paths that are associated with the files of the user system;

obtaining a reference set of names or paths associated with the files of the reference system; and determining an additional subset of names or paths included in the set of names or paths and not included in the reference set of names or paths based on a comparison between the set of names or paths and the reference set of names or paths;

wherein predicting the file as being exclusive for the users or exclusive for the user systems is further based on the additional subset of names or paths.

13. The method of claim 11, further comprising:

obtaining a set of names and paths that are associated with the files of the user system;

obtaining a reference set of names and paths associated with the files of the reference system; and determining an additional subset of names and paths included in the set of names and paths and not included in the reference set of names and paths based on a comparison between the set of names and paths and the reference set of names and paths, wherein predicting the file as being exclusive for the users or exclusive for the user systems is further based on the additional subset of names and paths.

14. The method of claim 11, further comprising:

observing traffic associated with the network to detect activity that changed, copied, moved, or accessed one or more files on user systems of the network; and generating, based on the detected activity, an audit trail associated with the files that were changed, copied, moved, or accessed, wherein the audit trail includes information to describe (i) one or more of the user systems at which the detected activity was observed, (ii) at least one user that owned the files associated with the detected activity, (iii) times when the users owned the files associated with the detected activity, and (iv) the detected activity.

15. The method of claim 11, further comprising:
obtaining, based on the scan, hashes associated with files that are on the other user systems; and
generating the alert responsive to a determination that at least one of the hashes obtained based on the scan matches the hash associated with the file predicted to be exclusive for the users or exclusive for the user systems.

16. The method of claim 11, further comprising:
generating the alert responsive to a determination that one or more files of a set of user systems on the network have different owners on more than one user system of the set of user systems.

17. The method of claim 11, further comprising:
identifying one or more files or file sets having auditing or security significance, wherein one or more systems of the network are designated to store the files or file sets having the auditing or security significance; and
generating the alert responsive to a determination that the files or file sets have been copied or moved off of the designated systems.

18. The method of claim 11, wherein the sets of hashes associated with the files of the user systems comprises one or more of checksums, complete cryptographic hashes, or partial cryptographic hashes.

19. A non-transitory, computer-readable media storing machine-readable instructions that, when executed, by a data processing apparatus cause the data processing apparatus to perform operations comprising:
obtaining a set of hashes that are associated with files of a user system, and a reference set of hashes that are associated with files of a reference system;
determining an additional subset of hashes included in the set of hashes and not included in the reference set of hashes based on a comparison between the set of hashes and the reference set of hashes;
predicting that a file is exclusive for one or more users or exclusive for one or more user systems, the file being associated with a hash included in the additional subset of hashes;
scanning one or more other user systems to determine what files are on the other user systems, wherein each of the other user systems is assigned to one or more other users or is not one of the user systems; and
generating an alert indicating unauthorized activity, wherein the alert is generated responsive to the scan indicating that the other user systems contain the file predicted to be exclusive for the users or exclusive for the user systems.

20. The computer-readable media of claim 19, wherein the operations comprise:
obtaining, based on the scan, hashes associated with files that are on the other user systems; and
generating the alert responsive to a determination that at least one of the hashes obtained based on the scan matches the hash associated with the file predicted to be exclusive for the users or exclusive for the user systems.

* * * * *